Feb. 23, 1960 R. A. PALMER 2,926,234
APPLIANCE
Filed Feb. 13, 1958 2 Sheets-Sheet 1
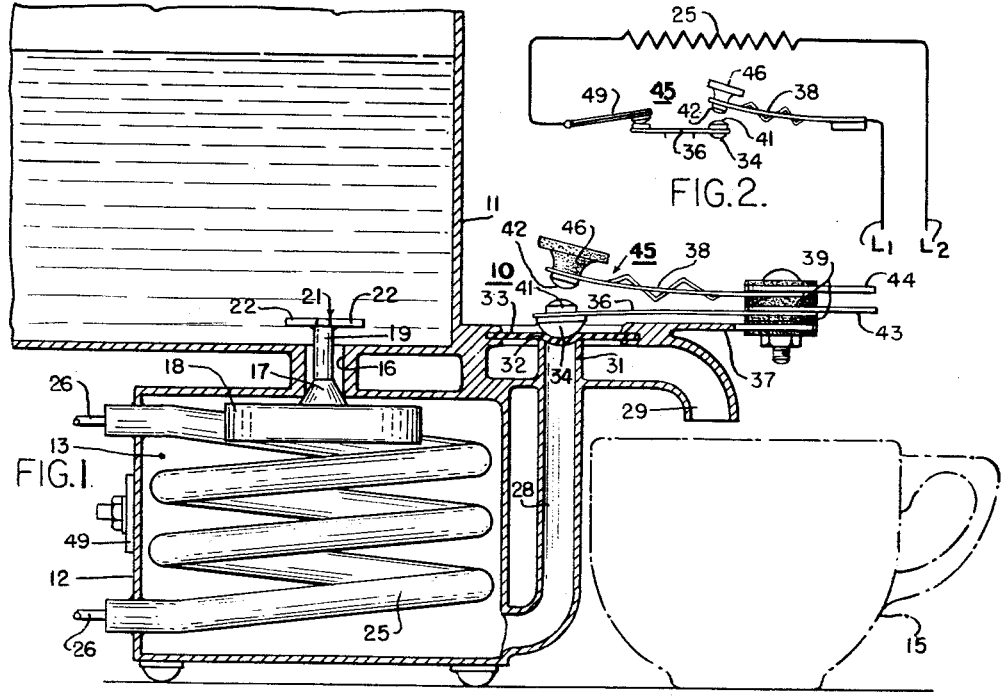
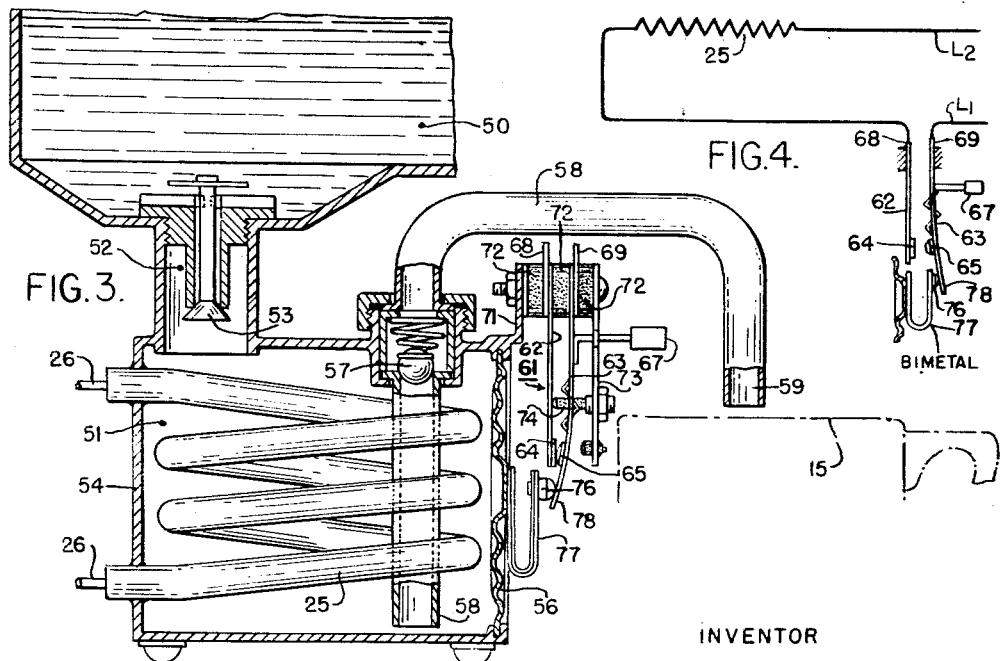
INVENTOR
REED A. PALMER
BY Ralph T. French
ATTORNEY Feb. 23, 1960  R. A. PALMER  2,926,234
APPLIANCE
Filed Feb. 13, 1958  2 Sheets-Sheet 2
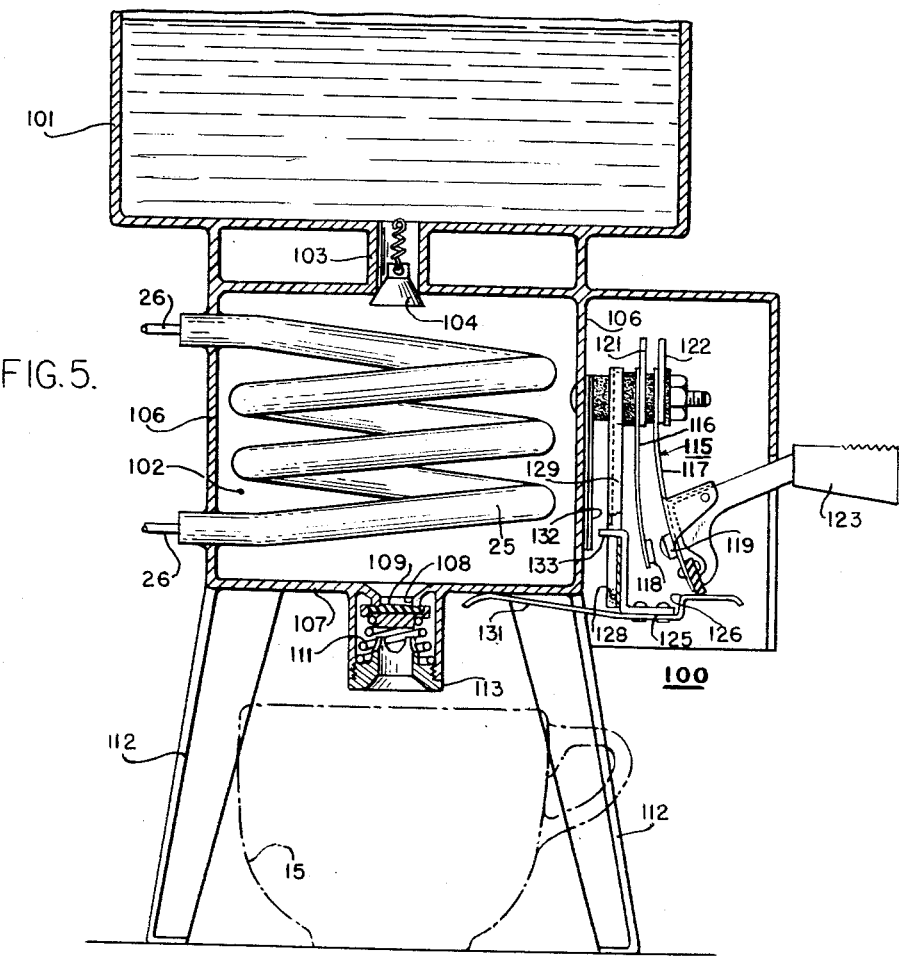
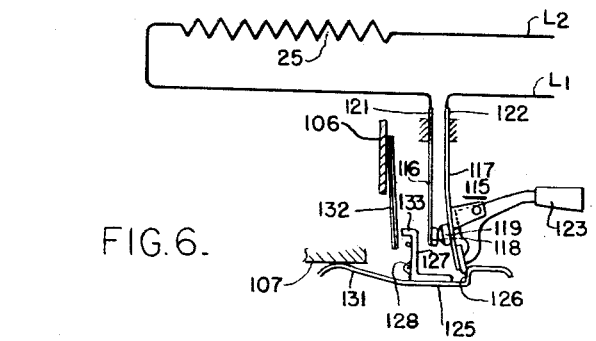
INVENTOR
REED A. PALMER
BY Robert T. French
ATTORNEY

United States Patent Office 2,926,234
Patented Feb. 23, 1960

2,926,234
APPLIANCE

Reed Albert Palmer, Mansfield, Ohio, assignor to Westinghouse Electric Corporation, East Pittsburgh, Pa., a corporation of Pennsylvania Application February 13, 1958, Serial No. 715,011

2 Claims. (Cl. 219—44)

This invention relates to heating apparatus, particularly to such apparatus for quickly heating a predetermined limited quantity of water to a temperature close to the boiling point. Such apparatus will be found especially useful in homes and restaurants for heating a single cup of water for beverages such as tea, chocolate, instant coffee, and the like.

The heating apparatus of the present invention includes a reservoir of a size to hold several cups of water with a heating chamber positioned below the reservoir with a passage therebetween for flow of water from the reservoir to the heating chamber. A valve member associated with the passage permits flow of water to the chamber but prevents flow of water and vapors from the heating chamber to the reservoir. An electrical heater is associated with the heating chamber to raise the temperature, and consequently, the pressure, of the water in the chamber to a level effective to discharge the contents of the chamber to a beverage cup disposed beneath a discharge opening of the chamber controlled by a pressure-seated valve. The heating chamber is designed of such a size that when the water has been discharged therefrom to the beverage cup, due to the action of the heater, the cup will be substantially filled. An electrical circuit is provided for the electrical heater and includes manually operable means for closing the circuit to initiate a heating cycle, and an automatically operable means for opening the circuit when the temperature or pressure of the water in the chamber has reached a desired predetermined level at which water will be discharged from the chamber to the beverage cup. In two illustrated forms of the invention, this automatic circuit-opening means is responsive primarily to pressure, and in a third illustrated form is responsive to temperature.

In the drawings:

Fig. 1 is a vertical sectional view through heating apparatus constructed in accordance with the present invention;

Fig. 2 is a diagrammatic illustration of the electrical circuit of the apparatus of Fig. 1;

Fig. 3 is a sectional view similar to Fig. 1 of a modified heating apparatus;

Fig. 4 is a diagrammatic illustration of the electrical circuit of the apparatus of Fig. 3;

Fig. 5 is a sectional view similar to Figs. 1 and 3, of a further modified heating apparatus; and Fig. 6 is a diagrammatic illustration of the electrical circuit of the apparatus of Fig. 5.

Apparatus of Fig. 1

Referring now to the drawings in greater detail, and particularly to Fig. 1, the reference character 10 indicates, in its entirety, heating apparatus comprising a reservoir 11 of a capacity to hold several cups of water or other liquid to be heated.

Wall structure 12 defines a heating chamber 13 below the reservoir of such size that its contents, when heated and discharged by its own vapor pressure, will substantially fill a conventional beverage cup 15 (indicated by dot-dash lines).

A passage 16 provides for flow of liquid from the reservoir to the heating chamber 13 to fill the latter. A valve 17 having a float 18 secured thereto is adapted to close the passage 16 when the chamber is substantially full of liquid to prevent escape of liquid and/or vapor from the chamber to the reservoir during heating of the liquid in the chamber. The valve 17 and float 18 are limited in their downward opening travel by stem 19 secured to stop 21 constructed of a plurality of arms 22 disposed in the reservoir and of a length greater than the diameter of the passage 16.

An electric heater 25 is positioned within the heating chamber 13, with its terminals 26 located externally of the chamber for connection to source of electrical power (not shown in Fig. 1, but shown diagrammatically in Fig. 2).

A conduit 28 communicates with the heating chamber near the bottom thereof and terminates in a downwardly directed outlet 29 so disposed that the conventional beverage cup 15 or like container may be positioned therebeneath. A projection 31 is located within the conduit 28, intermediate its terminal portions, and provides a seat 32 for a valve member 33 formed of resilient sheet material, for example, rubber, disposed in overlying relation to the seat 32. Due to the resiliency of the valve member, the latter may be lifted out of engagement with its seat 32 by pressure generated within the heating chamber, or may be forced against its seat by pressure applied externally of the valve member.

In the construction shown in Fig. 1, a predetermined external pressure is applied to the valve member 33 by a knob 34 carried by a flexible arm 36 mounted on a fixed support 37 carried by the heating apparatus 10. Also secured on the fixed support 37 is an over-center snap-acting arm 38 electrically insulated from arm 36 by a suitable spacer 39. Arms 36 and 38 carry contacts 41 and 42, respectively, adapted to engage in one position of the snap-acting arm 38 and to be separated in the other position of arm 38. The arms 36 and 38 also have terminals 43 and 44, respectively, associated therewith by which the arms and their contacts are incorporated in the electrical circuit for the heater 25 as a switch 45 adapted to open and close the circuit. Arm 38 preferably is provided, adjacent its free end, with a knob or finger piece 46 by which the arm is manually moved from the circuit-opening position shown in Fig. 1 to the other snap-over position where it closes the circuit and biases the knob 34 of the arm 36 against the valve member 33 to close the discharge passage from the heating chamber.

Operation—Apparatus of Fig. 1

Assuming that the reservoir 11 contains a supply of water, the heating chamber 13 will already have been filled by flow of water from the reservoir via the passage 16 between the reservoir and the chamber, and the passage 16 will be closed by the float-controlled valve 17. At this time, all parts will be in the positions illustrated in Fig. 1.

The user initiates a heating cycle by pressing downwardly on the finger-piece 46 of the switch 45 to snap the arm 38 over-center to bias the knob 34 against the resilient valve 33, thereby retaining the valve closed until such time as vapor pressure within chamber 13 forces the valve off its seat. At the same time that the arm 38 snaps over-center, the contacts 41 and 42 engage and establish an electrical circuit through the heater 25 in the chamber to heat the water therein. The heater is designed with sufficient wattage to bring the water in the chamber to approximately boiling temperature in a very short period of time.

The arms 36 and 38 of switch 45 are so designed that when switch 45 is cloesd, their combined force on valve 33 approximately equals the opposed force tending to open the valve, produced by the vapor pressure within chamber 13 as the water temperature approaches the boiling point. When the force of the vapor pressure on valve 33 exceeds the combined forces of arms 36 and 38 thereon, the valve will be raised from its seat 32, thereby snapping arm 33 over-center to its first position (as shown) to open the electrical circuit to the heater 25 and to permit rapid discharge of the water and vapor from chamber 13 to the cup 15 via conduit 28 and its outlet 29.

With the chamber 13 emptied of water and relieved of vapor pressure, valve 17 will open and a new supply of water will be sucked in from the reservoir to refill the chamber. This "sucking" of water into the chamber is effected by the condensation of residual vapors in the chamber induced by entry of the first relatively cool water from the reservoir. The relatively cool entering water will quickly remove most of the residual heat in the heater 25, and the apparatus will be ready for another heating cycle.

To prevent overheating of the chamber 13 in the event the reservoir is empty and no water enters the chamber, a temperature-responsive bimetallic switch 49, of conventional construction, is mounted on the wall of the chamber and is included in the electrical circuit in series with the heater 25, so that the circuit is opened when a temperature of the chamber is attained which is slightly higher than the temperature corresponding to the predetermined vapor pressure which operates switch 45 to open the circuit under normal operating conditions.

*Apparatus of Fig. 3*

In Fig. 3, the invention is shown incorporated in modified apparatus, wherein reservoir 50 supplies water to a heating chamber 51 through communicating passage 52 controlled by valve 53 which preferably is made of polyethylene or a similar material lighter than water so that it will float to passage-closing position when chamber 51 is filled. The heating chamber 51 is defined by wall structure 54, including a resilient portion 56 adapted to move outwardly at its center upon increase in vapor pressure within the chamber to a first predetermined value slightly lower than a second predetermined vapor pressure value at which a valve 57, controlling flow through discharge conduit 58, leaves its seat. Conduit 58 has a downwardly-directed outlet 59 to discharge water and vapor into beverage cup 15.

The chamber 51 contains an electrical heater 25 having terminals 26 for incorporation of the heater in the control circuit shown diagrammatically in Fig. 4. The circuit includes a switch 61 comprising flexible arms 62 and 63 carrying cooperating contacts 64 and 65, respectively. Arm 63 is an over-center snap-acting member carrying a knob or finger piece 67 by which it may be manually snapped to the circuit-closing position shown in Fig. 3.

The switch arms 62 and 63, together with their terminals 68 and 69, respectively, are mounted on extension 71 of the heating chamber wall structure 54 in stacked relation with members 72 electrically insulating the two arms from each other. A support arm 73 for adjusting screw 74 is included in the stack. Screw 74 serves to adjust the position of switch arm 62 relative to arm 63.

A knob 76 is carried by a U-shaped bimetallic member 77 secured to the center of the heating chamber wall structure resilient portion 56, and is adapted to move outwardly from the vertical centerline of the heating chamber upon increase in vapor pressure within the chamber during a heating cycle. Such outward movement of knob 76, due to corresponding movement of the center of flexible wall portion 56, causes the knob to engage an extension 78 of the snap-acting arm 63 to snap the latter from circuit-closing position to circuit-opening position.

*Operation—Apparatus of Fig. 3*

Assuming that the reservoir 50 contains a supply of water, the heating chamber 51 will already be filled with water, as in the arrangement described in connection with Fig. 1. The user will apply pressure (to the left as shown in Figs. 3 and 4) on finger piece 67, thereby snapping arm 63 to circuit-closing position and energizing electrical heater 25. Within a relatively short time the temperature of the water in chamber 51 will be raised close to the boiling point where the vapor pressure generated within the chamber will be sufficient to raise the valve 57 from its seat, thereby permitting rapid discharge of the water and vapor contents of the chamber through conduit 58 and outlet 59 to the beverage cup 15 to substantially fill the latter with very hot water.

Shortly before the vapor pressure in the chamber reaches the level at which valve 57 opens, it will force the flexible wall portion 56 outwardly, causing the U-shaped bimetal 77, through its knob 76, to engage extension 78 of snap-acting arm 63 to snap the latter over-center to circuit-opening position, thereby terminating the supply of current to heater 25. However, the residual heat in the heater will be ample to effect the further slight rise in vapor pressure necessary to lift valve 57 and effect discharge of the water and vapor.

The bimetal U 77 provides protection against possible overheating of the apparatus in case a heating cycle is started with no water in the heating chamber, due to the reservoir running dry. Lack of water in the chamber would result in failure to generate any vapor pressure to expand the flexible wall portion 56 to move the snap arm 63 to circuit-opening position. However, the heat generated will cause the bimetal U to open, with consequent movement of the leg thereof which carries knob 76 being sufficient to snap the arm 63 over-center to open the circuit.

*Apparatus of Fig. 5*

The modification shown in Fig. 5, like those of Figs. 1 and 3, provides a reservoir 101 for water which passes to a heating chamber 102 therebelow via passage 103 controlled by valve 104. The chamber 102 is defined by wall structure 106, including a bottom wall 107 having a discharge opening 108 therein. Discharge of water and vapor therethrough is controlled by valve 109, seated by pressure of compression spring 111. Preferably, the heating apparatus 100 includes legs 112 of sufficient length to provide, below the discharge outlet 113, space for a conventional beverage cup 15.

An electrical heater 25 with terminals 26, similar to that shown in the previously-described constructions, is housed in the heating chamber 102 and included in the circuit shown diagrammatically in Fig. 6. This circuit includes a switch 115 including resilient arms 116 and 117 carrying cooperating contacts 118 and 119, respectively, the arms being supported in stacked and electrically-insulated relation on the wall structure 106. Terminals 121 and 122 are associated with arms 116 and 117, respectively, in the stack, and provide for inclusion of the switch 115 in the electrical circuit in series with heater 25.

The resilient arm 117 carries a manually operable finger piece 123 which may be pressed downwardly to deflect the arm 117 sufficiently to cause engagement of contacts 118 and 119, thereby closing the electrical circuit and energizing heater 25. The arm 117 is retained in its deflected and circuit-closing position by a latch 125 provided with a shoulder 126 adapted to engage and retain the free end of arm 117. The latch 125 is secured to a Z bracket 127, pivotally mounted at 128 on a support arm 129 included in the stack containing the switch arms 116 and 117. The switch 125 includes a resilient extension 131 bearing against the heating chamber bottom wall 107 to bias the latch toward latching position at all times.

A bimetal 132 is mounted on the side wall of chamber 102 to accurately respond to changes in the temperature of the latter and is so disposed that, upon a rise in temperature, its lower free end moves outwardly from the wall structure to engage and move the upper arm 133 of the Z member 127 to swing the latter about its pivot 129, thereby moving latch 125 downwardly until its shoulder 126 no longer engages the free end of resilient arm 117 and the latter moves to circuit-opening position, as shown in Fig. 5.

*Operation—Apparatus of Fig. 5*

With a suitable supply of water in the reservoir 101, the heating chamber will be filled via passage 103 and back flow therethrough prevented by valve 104.

The user presses down on finger piece 123 to engage contacts 118 and 119 and close the electrical circuit, thereby energizing heater 25 within the chamber 102. The bimetal 132 and the discharge port valve closing spring 111 are so designed and selected that the latter will permit opening of valve 109 at a preselected vapor pressure within the chamber, and the bimetal will move the Z member 127 to release latch 125 and open the electrical circuit at a temperature slightly above the temperature corresponding to the preselected vapor pressure.

It will be noted that in the construction of Fig. 5, the main circuit-opening mechanism is entirely temperature-responsive, and hence will function to interrupt the circuit even if the apparatus is inadvertently operated with no water.

While the invention has been shown in several forms, it will be obvious to those skilled in the art that it is not so limited, but is susceptible of various other changes and modifications without departing from the spirit thereof.

What is claimed is:

1. In apparatus for heating and discharging measured quantities of a liquid for beverage and like purposes; a reservoir for liquid to be heated; wall structure defining a heating chamber dimensioned to contain a predetermined quantity of liquid and disposed below the reservoir and communicating therewith, whereby liquid to be heated may flow from the reservoir to the heating chamber; liquid discharge means leading from the chamber near the bottom thereof operable under predetermined elevated vapor pressure of liquid in said chamber to discharge a measured quantity thereof; a valve member for closing said discharge means; electrical heating means associated with said chamber to heat the liquid therein, thereby raising its vapor pressure to the predetermined value; an electrical circuit for said electrical heating means; and means manually movable from a first position where it opens said circuit to a second position where it closes said circuit and biases said valve member into closing position, said manually movable means being so constructed and arranged that attainment of said predetermined elevated vapor pressure within said heating chamber lifts said valve member to open said discharge means, thereby returning said manually movable means to its first position and opening said electrical circuit.

2. In apparatus for heating and discharging measured quantities of a liquid for beverage and like purposes; a reservoir for liquid to be heated; wall structure defining a heating chamber dimensioned to contain a predetermined quantity of liquid and disposed below the reservoir and communicating therewith, whereby liquid to be heated may flow by gravity from the reservoir to the heating chamber; liquid discharge means leading from the chamber near the bottom thereof operable under predetermined elevated vapor pressure of liquid in said chamber to discharge a measured quantity thereof; means for maintaining the discharge conduit closed until the predetermined elevated vapor pressure within the heating chamber is attained; electrical heating means associated with said chamber to heat the liquid therein, thereby raising its vapor pressure to the predetermined value; and an electrical circuit for said electrical heating means, said circuit including a pair of arms, at least one of which is resilient, a pair of contacts carried one by each arm and adapted, when in engagement, to close said circuit, means mounting said arms in electrically insulated relation with respect to each other with said contacts normally separated, manually operable means for flexing the resilient arm to move the contact carried thereby into engagement with the other contact to effect closing of the circuit, latching means for temporarily retaining the flexed arm in contact engaging position, and means including a bimetal responsive to the temperature of the wall structure defining the heating chamber for releasing said latching means to open the circuit when the temperature of said wall structure reaches a predetermined value.

References Cited in the file of this patent

UNITED STATES PATENTS

| | | |
|---|---|---|
| 1,990,546 | Hubbard | Feb. 12, 1935 |
| 2,169,852 | Scott | Aug. 15, 1939 |
| 2,268,633 | Aske | Jan. 6, 1942 |
| 2,562,763 | Best | July 31, 1951 |
| 2,568,474 | Van Sciver | Sept. 18, 1951 |
| 2,688,911 | Hochmayr | Sept. 14, 1954 |
| 2,708,398 | Mertler | May 17, 1955 |
| 2,783,703 | Brown | Mar. 5, 1957 |
| 2,835,782 | Stiebel | May 20, 1958 |